United States Patent
Owens

[15] 3,663,275
[45] May 16, 1972

[54] COATED FILLED REGENERATED CELLULOSE FILM

[72] Inventor: Daniel Kenyon Owens, Bon Air, Va.

[73] Assignee: E. I. du Pont de Nemours and Company, Wilmington, Del.

[22] Filed: June 30, 1970

[21] Appl. No.: 51,392

[52] U.S. Cl. .............................. 117/144, 106/193 I, 117/145
[51] Int. Cl. .................. B32b 23/08, B32b 23/04, C08j 1/38
[58] Field of Search ......................... 117/144, 145; 162/181; 106/165, 193 J, 193 I; 264/188, 211

[56] References Cited

UNITED STATES PATENTS

| | | | |
|---|---|---|---|
| 3,428,483 | 2/1969 | Owens | 117/145 |
| 2,950,992 | 8/1960 | Brillhart et al. | 117/145 X |
| 2,022,064 | 11/1935 | Wallach | 106/193 X |
| 2,052,558 | 9/1936 | Dreyfus | 106/193 X |
| 2,084,389 | 6/1937 | Dreyfus | 106/193 X |
| 2,892,730 | 6/1959 | Kloepfer et al. | 106/193 |
| 2,559,893 | 7/1951 | Nadean et al. | 106/193 X |

*Primary Examiner*—William D. Martin
*Assistant Examiner*—M. R. Lusignan
*Attorney*—Donald W. Huntley

[57] ABSTRACT

A process for preparing coated regenerated cellulose film in which bentonite clay is admixed in a cellulose xanthate viscose prior to extrusion, followed by preparing a regenerated film from the viscose and applying a polymeric coating to at least one surface of the regenerated film, as well as the resulting coated products, characterized by improved winding properties.

3 Claims, No Drawings

COATED FILLED REGENERATED CELLULOSE FILM

BACKGROUND OF THE INVENTION

In the preparation of coated regenerated cellulose films, it is often necessary to modify the surface characteristics of such products to improve the slip and blocking performance of a coated film. Accordingly, various additives have previously been added to coating compositions to provide a surface having increased roughness. While such coating additives have satisfactorily increased surface roughness, the additives often penetrate the polymer coating so as to give a discontinuous coating which increases the moisture and gas permeability of the finished product. In addition, particulate additives in a coating bath often result in settling and agglomeration during the coating operation, causing uneven particle distribution in the coating.

SUMMARY OF THE INVENTION

The instant invention provides a coated regenerated cellulose film and a process for its preparation which provides excellent surface characteristics in combination with maximum moisture and gas impermeability.

Specifically, the instant invention provides an improvement in the process for preparing regenerated cellulose films by the viscose process and subsequently coating the films with a polymeric coating, which improvement comprises adding about from 0.1 to 1.0 percent by weight of cellulose of bentonite clay to the viscose mixture prior to extrusion.

There is further provided a coated film comprising a base of regenerated cellulose film having about from 0.1 to 1.0 percent by weight of bentonite clay incorporated therein and a polymeric coating on at least one surface thereof.

DESCRIPTION OF THE PREFERRED EMBODIMENTS

The regenerated cellulose films used in the instant invention are prepared by the viscose process generally described in Brandenberger, U.S. Pat. Nos. 1,548,864 and 1,601,289, both hereby incorporated by reference. In this process, an alkaline aqueous solution of sodium cellulose xanthate is forced through an elongated orifice in the form of a continuous sheet into a coagulating bath where a coherent web is formed and subsequently regenerated, washed, desulfured and bleached. At this point, the gel-state web is in a highly swollen state and contains about from 200 to 350 percent by weight of water, based on the cellulose content of the web.

In accordance with the instant invention, about from 0.1 to 1.0 percent bentonite clay is added to the viscose, that is, the aqueous solution of sodium cellulose xanthate prior to its extrusion in the form of a sheet. Bentonite clays are aluminum magnesium sodium silicates such as the montmorillonite clays commercially available from American Lava Company as "Voclay BC." The particular particle size of the clay added to the viscose mixture is not critical to the instant invention so long as the particle size does not exceed two times the thickness of the regenerated cellulose film. The added clays will often disperse in the viscose mixture to a particle size smaller than that originally added. Preferably, the bentonite clay should be added in quantities to comprise about from 0.5 to 0.75 percent by weight of regenerated cellulose, these quantities having been found to provide especially desirable product characteristics.

While the method of addition is not critical to the invention, it has been found particularly satisfactory to prepare an aqueous suspension of the particulate clay and inject this into the viscose stream. The preparation of a slurry facilitates metering of the clay. Suspensions having a 1–10 percent solids content have been used effectively. Upon injection into the viscose, the clay can be admixed using the mixing apparatus conventionally found in viscose production facilities. After addition of the clay, the viscose is extruded and regenerated in the usual manner.

After preparation of the regenerated cellulose film, the filled film product is dried and coated on at least one side with a transparent organic polymeric material of the type generally used in the art to improve moisture resistance, heat sealability and gas permeability. Polymeric materials of this type include nitrocellulose and vinylidene chloride polymers and copolymers. Representative coating polymers are set forth in Owens, U.S. Pat. No. 3,428,483, hereby incorporated by reference. These materials are generally applied as solutions or dispersions in volatile organic solvents such as acetone, methyl ethyl ketone, ethyl acetate, tetrahydrofuran and toluene. The solutions can be applied by any convenient apparatus of the type generally used in the art including immersion coating techniques and contact coating apparatus such as doctor rolls. In general, immersion coating techniques are preferred since it is generally desired to apply the coating material to both sides of the regenerated cellulose web. After coating, the web is dried to remove the solvent and solidify the coated material, and humidified to replace the moisture lost from the regenerated cellulose substrate during the drying of the coating.

The instant invention provides coated films which exhibit winding, anti-block and other surface properties equivalent in all respects to regenerated cellulose films having filler in the coating material. The invention is based on the discovery that the inclusion of filler material in the regenerated cellulose substrate will not be erased or negated by the subsequent coating of the substrate. This discovery permits increased efficiency in processing regenerated cellulose films, since the improved winding properties are available before coating.

The instant invention is further illustrated by the following specific examples.

EXAMPLES 1–3

In Examples 1 and 2, regenerated cellulose films are prepared according to the usual viscose process. A 3 percent aqueous slurry of bentonite clay is prepared. The particle size of the clay upon incorporation into the aqueous slurry varies from 0.1 to 30 microns. The aqueous slurry of the clay is injected into the viscose stream by a metering pump in such quantities as to add 0.5 and 0.75 percent clay to the viscose, based on the weight of regenerated cellulose in the finished film product, in Example 1 and 2, respectively. The viscose is then processed in the usual manner to prepare regenerated cellulose films having a thickness of about 0.8 mil. The finished films are then coated with vinylidene chloride copolymer.

In Example 3, a similar regenerated cellulose film is prepared, except that no clay is added to the regenerated cellulose base. Instead, clay is added to the vinylidene chloride copolymer coating composition so as to comprise 0.75 percent clay in the finished copolymer coating.

The coated films of Examples 1 and 2 and control Example 3 are compared with respect to several physical properties including blocking, winding, slip, permeability and heat seal characteristics. The internally filled films of the instant invention, as illustrated in Examples 1 and 2, are equivalent in all respects to the control film of Example 3.

I claim:

1. A regenerated cellulose film having about from 0.1 to 1.0 percent by weight of particulate bentonite clay incorporated therein and having a transparent organic polymeric coating on at least one surface thereof, the polymeric coating being substantially free of particulate additive.

2. A film of claim 1 having about from 0.5 to 0.75 percent bentonite clay incorporated therein.

3. A film of claim 1 wherein the polymeric coating consists essentially of polymer selected from nitrocellulose and vinylidene chloride polymers and copolymers.

* * * * *